Nov. 27, 1962     K. L. HERTEL ETAL     3,065,664

FIBER MEASUREMENT

Filed Sept. 10, 1959     2 Sheets-Sheet 1

INVENTORS
KENNETH L. HERTEL
HUGH G. NEIL
BY
Swecker + Mathis
ATTORNEYS

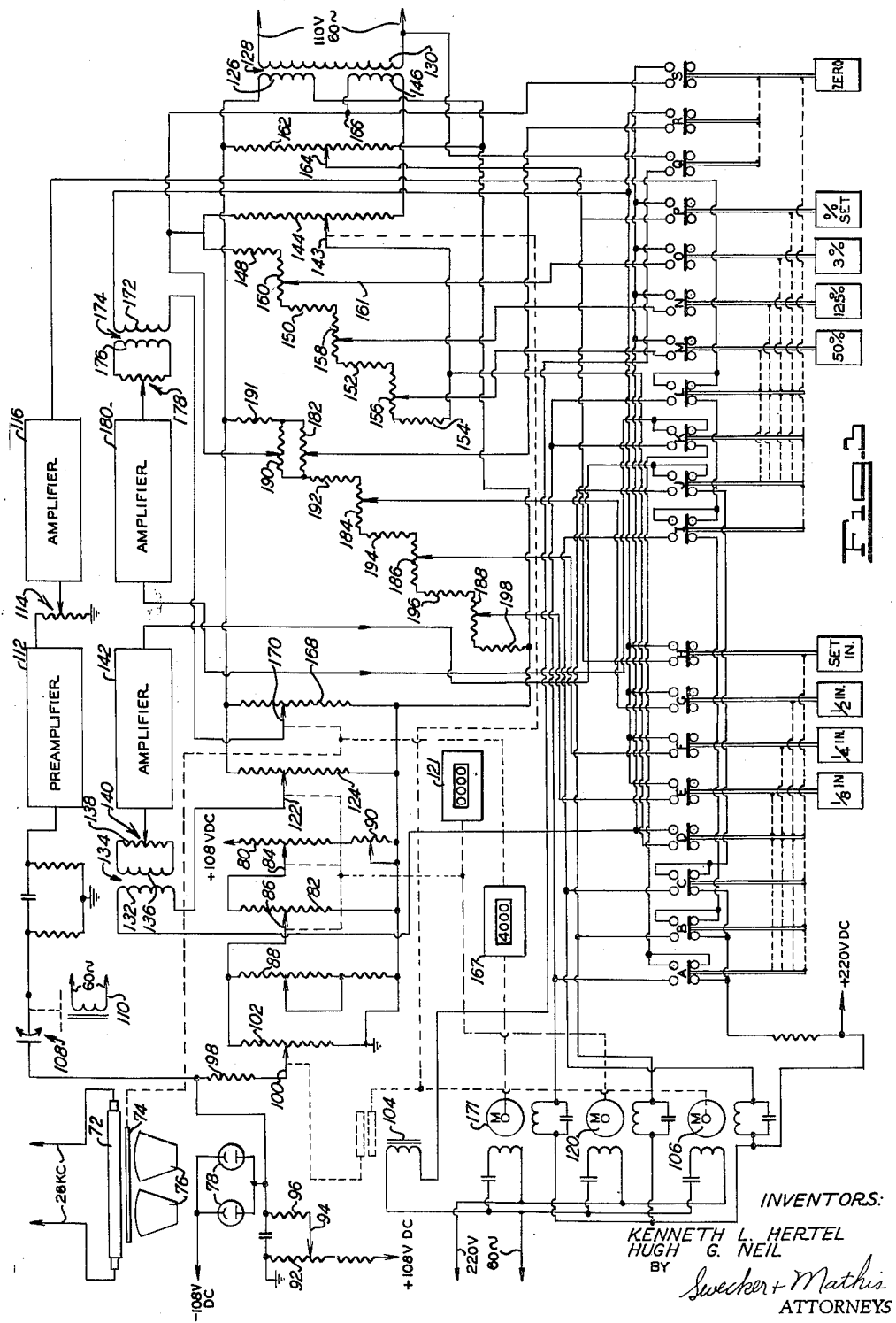

United States Patent Office 3,065,664
Patented Nov. 27, 1962

3,065,664
FIBER MEASUREMENT
Kenneth L. Hertel and Hugh G. Neil, Knoxville, Tenn., assignors to The University of Tennessee Research Corporation, Knoxville, Tenn., a corporation of Tennessee
Filed Sept. 10, 1959, Ser. No. 839,250
10 Claims. (Cl. 88—14)

This invention relates to fiber measurement, and more particularly, to methods of and apparatus for measuring significant fiber length characteristics of staple fiber populations.

Instruments of the type disclosed in Hertel Patent No. 2,299,983, granted October 27, 1942, have been used extensively to determine the distribution of fibers of different lengths in cotton samples. As ordinarily constructed and operated, such instruments produce small charts or graphs on which a length value is plotted against an amount value. The most useful type of curve in this category is one which reflects the length distribution characteristics of a random sample of parallelized fibers gripped along a randomly located line at right angles to the lengths of the fibers. At any given point on such a curve, one coordinate represents a distance of protrusion of fibers from the grip line and the other coordinate represents the number of fibers that protrude in one direction at least that far from the grip line.

This type of curve is equivalent to the second successive integral of the length-probability curve for the fiber sample, and for this reason it is especially suitable for the determination of various mean length quantities. For example, a tangent to the curve at the point of no protrusion, i.e., at the grip line for the sample, intersects the length or distance axis of the graph at a point corresponding to the mean length of the fibers in the sample. Similarly, another tangent to the curve yields a value for the upper half mean length.

It will be recognized, however, that the drawing of tangents and the measuring of the charts produced by these instruments are tasks which require considerable skill and a great deal of time. Moreover, even the most skilled workers have not been able to attain results with a reliability as great as is desired in this type of work. Judgment and dexterity play too big a role in these tangent-drawing procedures.

Another objection to the practices employed heretofore in the measurement of fiber length distribution in cotton samples has been that the values obtained from the procedures have not been as useful as might be hoped. In particular, there has been a lack of correlation between the mean length values obtained and such commercially important factors as classers' staple length and the spinnability of the fibers.

Accordingly, it is an important object of the present invention to provide a method of and apparatus for determining a fiber length distribution value or set of values which will correlate more closely with spinnability and/or with classers' staple length.

Another object of the present inventiton is to provide a method and apparatus by which the desired fiber length distribution values may be obtained without resort to the drawing of tangents, without the physical measuring of chartered quantities, and without requiring complex computations on the part of the operator.

A more specific object of the present invention is to provide an instrument of this character which will be capable of computing the desired fiber length distribution values and registering these directly as numerals.

These objectives may be attained, in accordance with the present invention, by providing methods of and apparatus for (1) ascertaining, from a random sample gripped along a randomly located line, the number of fibers protruding at least a predetermined distance from the grip line, and then (2) ascertaining a distance about which it may be said that a predetermined fraction of said number of fibers protrude at least as far as said distance. Thus, the invention retains the concept of a randomly gripped random sample. However, instead of employing tangents to measure mean values, such as mean length and upper half mean length, the present invention provides for the evaluation of length characteristics believed to have direct bearing upon the working of the fibers in the yarn making process.

The physical significance of this concept can be visualized by relating it to the conditions encountered in the zone between successive pairs of drafting rollers in a spinning frame. In this zone, some of the fibers will extend all of the way between the successive roll pairs and will be gripped by both roll pairs at the same instant. Other fibers will be gripped solely by the front pair of rolls, others will be gripped solely by the rear rolls, and still others will not be gripped by either of the roll pairs. The drafting of the fibers obviously will depend upon the relative amounts of the fibers in the several groups. For example, it is believed desirable to have a small, but significant, percentage of the fibers extending entirely across the drafting zone to assure the maintenance of continuity in the strand being processed. It is not the mean length that matters so much as it is the actual percentage of fibers in a given category. By determining directly the protrusion characteristics of the sample, the present invention provides data directly usable in ascertaining proper machine settings, etc.

The type of sample employed in connection with the present invention may be the same as that employed in connection with instruments of the type disclosed in the above identified Hertel patent. Although the preparation and holding of the sample are matters of importance in obtaining reliable results, these matters form no part of the present invention and they need not be described in detail here.

The scanning of the sample also may conform to the practices employed heretofore. A light source is disposed so as to provide a scanning light beam extending at right angles to the lengths of the parallelized fibers, and light sensitive means produce an effect corresponding in magnitude to the amount of light passing through the zone occupied by the sample. The grip line for the fibers and the scan line are relatively movable so that the sample may be scanned at any selected distance from the grip line.

In using the invention, the equipment is first brought to a condition which reflects the size of the particular sample being examined. In other words, the invention provides for the establishment of an individual standard number-of-fibers value for each sample. This may be the total number of fibers gripped by the sample holder, or it may be the total number of fibers protruding from the sample holder some predetermined distance, such as for example, one-eighth or one-quarter of an inch.

The operation which establishes this standard number-of-fibers quantity for the sample also conditions the instrument for a second step or operation. During this second step, the instrument automatically senses protrusion characteristics of some predetermined fractional part of the standard number-of-fibers value for the particular sample. In a typical application, the invention might serve to establish that 12.5 percent of the standard number-of-fibers protrude from the grip line at least as far as some measured distance.

A better understanding of the invention and of its many advantages will be obtained from a consideration of the following detailed description of the embodiments thereof illustrated in the accompanying drawings, in which:

FIG. 3 is a circuit diagram for a measuring instrument in accordance with the present invention.

Figure 1:
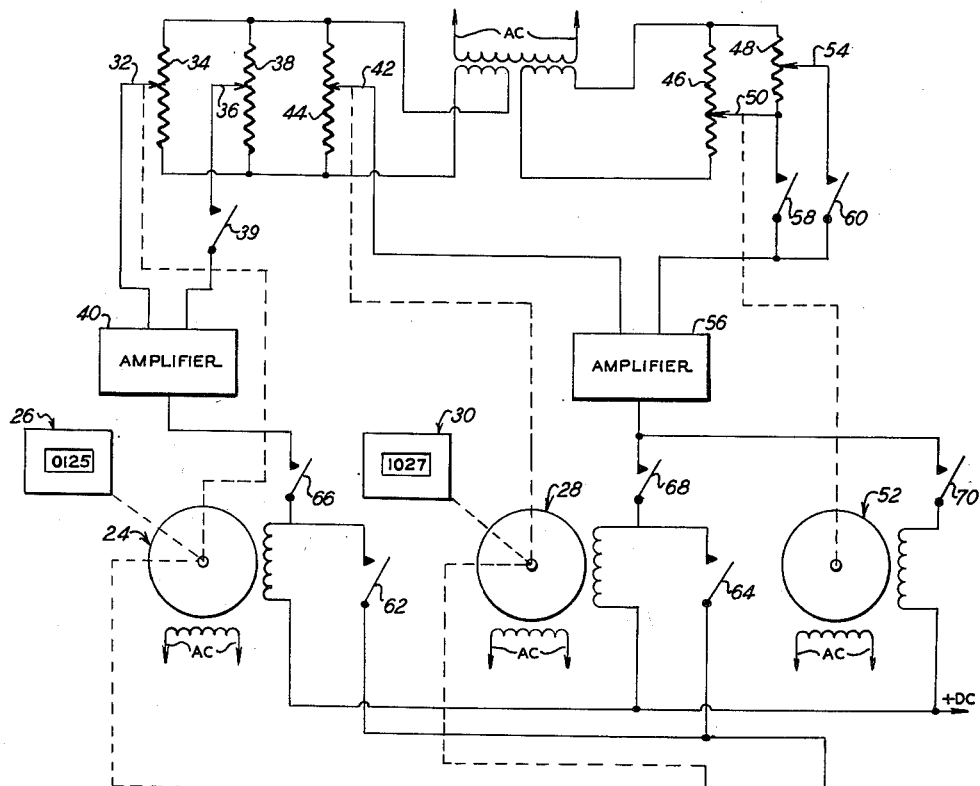
FIG. 1 is a diagram illustrating the principles of the invention.

In FIG. 1, means for holding a fiber sample, scanning it, and producing an electrical effect related to the amount of light passing through the sample zone are indicated diagrammatically in the lower right portion of the view. An edge view of the sample 4 is shown. This sample 4 is a substantially planar random sample of parallelized fibers gripped by means 6 along a randomly located line extending at right angles to the lengths of the fibers.

On one side of the sample 4, there is located a suitable light source 8, which preferably is provided with a shield 10 having a slit 12 therein extending at right angles to the fibers in the sample 4 and parallel with respect to the sample holder 6. The slit 12 establishes a scan line along which light from the source 10 may pass into the sample zone.

On the opposite side of the sample 4, light sensitive means 14 are provided for receiving the light passing through the zone occupied by the fibers. A photoelectric cell 14 has been depicted in FIG. 1 as a suitable light sensitive means, but other structures may be employed if desired.

The electrical effect produced in the cell 14 is a function of the amount of light passing through the zone occupied by the fiber sample 4. This, in turn, is a function of the number of fibers intersecting the scan line established by the slit 12.

In order to evaluate the number of fibers detected by the light beam, the system is provided with a comparator or balance unit which includes the cell 14 and a potentiometer 16 having an adjustable contact or tap 18. The tap 18 is so connected to the cell 14, and the unit is so energized, that the potential at the tap 18 will be some predetermined value, e.g., zero, whenever conditions of balance are attained. Any devitation from this predetermined voltage at the tap 18 will result in a signal being fed to a device 20 for converting the D.C. signal to an A.C. signal of comparable magnitude. This signal is then amplified by a suitable A.C. amplifier 22 of conventional construction.

As explained in the aforesaid Hertel patent, the relation of number of fibers to quantity of light reaching the cell will depend upon the design of the apparatus. This function and the actual construction of the comparator unit are of no particular importance in the present invention. It is important that the change produced by a unit of motion of an adjustable element, such as the tap 18, be the same as the change produced by adding or subtracting a unit number of fibers in the scan line. The means used heretofore to attain this result are satisfactory as far as the present invention is concerned.

The broken lines in FIG. 1 represent mechanical interconnections. It will be observed that one such line extends from the sample holder 6 to an electric motor 24, indicating that the motor 24 serves to move the sample holder 6 up and down relative to the scan line established by the slit 12. Hence, the position of the output shaft of the motor 24 is a function of the distance between the grip line for the sample and the scan line, and as such, it may be employed to drive an indicator or register 26 which gives a numerical value to the distance or length quantity.

It also will be observed that the movable tap 18 on the potentiometer 16 is mechanically coupled to a motor 28. Consequently, the position of the output shaft of the motor 28 is a function of the position of the tap 18. This in turn is a function of the number of fibers intersecting the scan line when the comparator unit is in balance, that is, when there is no signal being transmitted from the converter 20 to the amplifier 22. The shaft of the motor 28 preferably is mechanically connected to a second indicator or register 30 for obtaining a numerical value for the number-of-fibers quantity.

The motors 24 and 28 serve additionally to drive adjustable elements of other comparators employed in the system. The motor 24 is coupled mechanically to an adjustable tap 32 on a potentiometer 34 forming a part of a second comparator or balance unit. In this unit, the potential at the tap 32 is compared with the potential at the tap 36 on another potentiometer 38. The tap 36 is manually adjustable so that its position may be set as desired by the operator of the device, and it is connected through a switch 39 to a suitable A.C. amplifier 40 of conventional construction. Any difference in potential between the taps 32 and 36 represents a signal which is fed to the amplifier 40.

The motor 28 additionally is coupled mechanically to a tap 42 on a potentiometer 44 forming a part of a third comparator or balance unit. The potential at the tap 42 is compared with the potential at selected points in a circuit made up of a potentiometer 46 and a potentiometer 48. One end of the potentiometer 48 is connected to the line, but the other end is connected to an adjustable tap 50 for the potentiometer 46. Hence, the coil of the potentiometer 48 actually is in parallel with the upper end portion of the coil of the potentiometer 46. For this reason, the potential at the tap 50 is not a straight line function of the position of this tap along the potentiometer 46, but this variation does not affect the performance of the system as a whole. Note in this connection that the tap 50 is mechanically coupled to a motor 52 which has no other mechanical output which must be related to the movement of the tap 50. Hence, amount of movement is never a factor of importance.

The potentials which may be compared with the potential at the tap 42 on the potentiometer 44 are those which exist at the tap 50 on the potentiometer 46 and at a manually adjustable tap 54 on the potentiometer 48. The differential may be fed to a suitable A.C. amplifier 56 of conventional construction. Switches 58 and 60 are provided in the circuit so that the operator of the equipment may select which of these reference potentials he wishes to compare with the potential at the tap 42 on the potentiometer 44 in any given operation of the instrument.

The output of the amplifier 22 may be fed either to the motor 24 or to the motor 28. When a switch 62 is closed, the output from the amplifier 22 passes to the motor 24. If the signal passing into the converter 20 is negative, the motor 24 will be driven in one direction, and if the signal is positive, the motor will be driven in the opposite direction.

Another switch 64 permits the output from the amplifier 22 to be delivered to the motor 28. Again, a negative signal passing into the converter 20 will result in rotation of the motor 28 in one direction, while a negative signal will cause rotation of the motor 28 in the opposite direction. It is intended that one or the other of the switches 62 and 64 will remain open at all times, so that the output from the amplifier 22 will not be fed to both the motor 24 and the motor 28 at the same time.

It will be helpful at this point to consider the physical significance of positive and negative signals at the converter 20 and the effects which such signals may produce upon the positions of the sample holder 6 and of the tap 18 for the potentiometer 16. A negative signal at the converter 20 represents a condition in which the light passing to the cell 14 corresponds to a number of fibers greater than the number-of-fibers value represented by the position of the tap 18. Conversely, a positive signal at the converter 20 would represent a condition in which fewer fibers actually were located in the scan line than were indicated by the physical position of the tap 18.

It will be obvious that either a positive or a negative signal at the converter 20 may be eliminated by moving either the sample holder 6 or the tap 18 on the potentiometer 16. If the sample holder 6 is moved downwardly, fewer fibers will intersect in the scan line. If it is moved upwardly, more fibers will intersect the scan line and there will be less light upon the cell 14. Similarly, upward movement of the potentiometer tap 18 will tend to raise the potential at that point, while a downward movement of the tap 18 will tend to lower the potential at that point.

The significance of feeding the output of the amplifier 22 to one of the other of the motors 24 and 28 now will be apparent. If the output from the amplifier 22 is fed to the motor 24, as by closing the switch 62, the motor 24 will move the sample holder 6 in such a direction as to correct the imbalance in the circuit. If the output from the amplifier 22 is fed to the motor 28, as by closing the switch 64, the motor 28 will drive the tap 18 on the potentiometer 16 in such a direction as to balance the circuit. Thus, the end result is always to restore the balance in the input circuit to the converter 20.

Similar arrangements are provided at each of the remaining two comparator or balance units in the system. When a switch 66 is closed, the amplifier 40 will drive the motor 24, and the motor 24 will move the tap 32 along the potentiometer 34 to restore a balance between the potential at the tap 32 and the potential at the tap 36. When a balance is restored, there is no signal input for the amplifier 40, and the motor 24 stops.

The output from the amplifier 56 may be delivered to the motor 28, by closing a switch 68, or it may be delivered to the motor 52 by closing a switch 70. It is intended that one or the other of these switches 68 and 70 remain open at all times so that the output from the amplifier 56 will not pass to both of the motors 28 and 52 at the same time.

When the output from the amplifier 56 is delivered to the motor 28, the motor 28 will move the tap 42 along the coil of the potentiometer 44 to restore a balance in the input circuit for the amplifier 56. When the output from the amplifier 56 is fed to the motor 52, the motor 52 will move the tap 50 along the potentiometer 46 to restore a balance in the input circuit for the amplifier 56.

In using the system shown in FIG. 1, there are two major operations. The first of these is the establishment of a number-of-fibers or amount standard. The second operation then determines a length or distance characteristic of a predetermined fractional part of the standard set by the first operation. A reference to FIG. 2 of the drawings will help to clarify these concepts.

Figure 2:
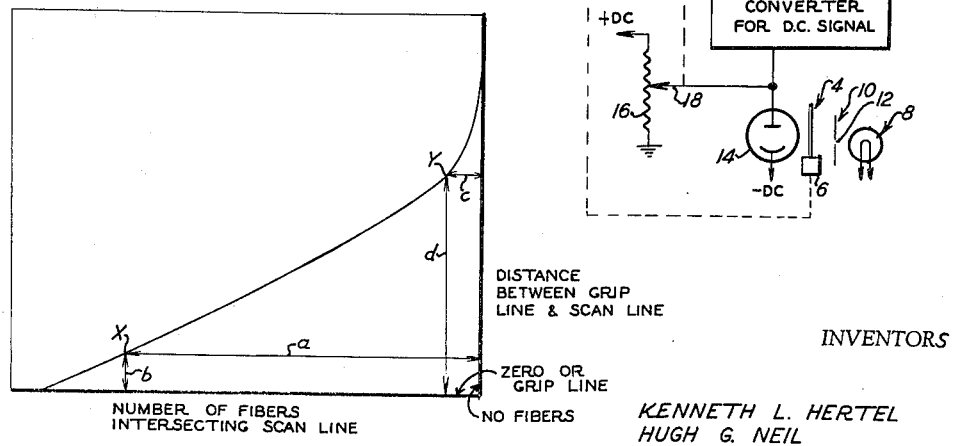
FIG. 2 is a chart or graph indicating the quantities evaluated by the present invention.

The curve shown in FIG. 2 is a curve of the type produced by the measuring instruments used heretofore. Its horizontal coordinate is a function of the number of fibers intersecting the scan line in the instrument. Its vertical coordinate is a function of the distance between the scan line and the line along which the fibers of the sample are gripped. As a matter of physical interpretation, the curve may be thought of as a line connecting the free ends of the fibers in a sample gripped along a horizontal line corresponding to the base of the chart, i.e., the "zero" line. Some fibers will protrude from the grip line only a very short distance. Their free ends may be thought of as corresponding in position to the left end portion of the curve. On the other hand, a few of the fibers will extend a substantial distance away from the grip line. The free ends of these would then correspond to the right end portion of the curve.

The horizontal extent of the curve depends upon the number of fibers in the sample. That is to say, if a large sample is used, the curve will have a large horizontal extent, but if a small sample is used, the horizontal extent on the curve will be small. On the other hand, the vertical extent of the curve depends upon the fiber length distribution. This is a characteristic of the fiber population, and for a given variety or blend of cotton, it should not vary materially from one representative sample to another.

In the present invention, the first major operation is the establishment of a standard as to number of fibers. Since samples vary in size, the system must be flexible enough to permit establishment of a quantitative standard for each particular sample being processed.

Moreover, the exact nature of the number-of-fibers standard need not be fixed. In measurements made for the purpose of securing information of particular application to the processing of the fibers during the formation of yarns from them, it has been found desirable to eliminate from consideration those fibers which protrude from the grip line very short distances. This is the situation depicted by the point $x$ on the curve in FIG. 2. This point is a distance $b$ away from the grip line, so that the number-of-fibers value $a$ corresponds not to the total number of fibers gripped by the sample holder, but rather to the total number of fibers which protrude from the sample holder a distance at least as great as $b$. For practical purposes, it is preferred usually that the distance $b$ be about one-quarter inch, but interesting results also have been obtained using one-eighth inch as the value of $b$.

It will be understood, of course, that still other values of $b$ may suit particular requirements. In some circumstances, it will be desirable to use the total number of fibers gripped by the sample holder as the standard or reference value. In this type of situation, the value $b$ will be zero, and the value $a$ would correspond to the distance from the origin, or "No Fibers" line, to the intersection of the curve with the horizontal axis.

The next major step according to the present invention involves the establishment of a protrusion distance for some predetermined fractional part of the reference quantity $a$. In FIG. 2, this fractional part is assumed to be the quantity represented by the distance $c$, and it will be observed that this quantity appears at a point $y$ on the curve. For example, in setting up spinnability criteria, it may be useful to know the distance of protrusion of ten percent of those fibers which protrude at least one-quarter inch from the grip line. In such an instance, $c$ would correspond numerically with ten percent of $a$. With this value fixed, one proceeds along the curve to the point $y$, and then the distance of protrusion $d$ may be measured. This distance might well correspond to the optimum distance between successive roll pairs in a spinning frame, for example.

Returning now to the system shown in FIG. 1, it is pointed out that the distance $b$ may be established for the system by manual adjustment of the tap 36 on the potentiometer 38. If this tap 36 is moved all the way to the top of the potentiometer 38, the distance $b$ will be zero. Downward movement of the tap 36, on the other hand, results in an increase in the distance $b$. The other manually adjustable potentiometer tap 54 in the system shown in FIG. 1 provides a means by which one may select a fractional part of the amount standard. If the tap 54 is at the bottom of the potentiometer 48, the ratio of $c$ to $a$ will be equal to 1. Then, as the tap 54 is moved upwardly along the coil of the potentiometer 48, the ratio of $c$ to $a$ becomes smaller and smaller. When the resistance of that portion of the coil 48 of the potentiometer above the tap 54 is one-tenth of the total resistance of the coil 48, the ratio of $c$ to $a$ is one-tenth, or ten percent.

In operating the system of FIG. 1, the first step, after the necessary adjustments have been made in the positions of the manually adjustable taps 36 and 54, is the closing of switches 39, 58, 64, 66, and 70. Unless fiber holder 6 is already at the selected distance $b$ from the scan line, there will be an imbalance in the potential of the taps 32 and 36 on the potentiometers 34 and 38. This imbalance, amplified by the A.C. amplifier 40 is fed to the motor 24. The motor 24 serves to drive the tap 32 to a new position where a balance will be reached and there will be no input to the amplifier 40.

The running of the motor 24 also adjusts the position of the sample holder 6 so that the distance between the sample holder and the scan line will conform to the selected distance $b$. This distance will be reflected numerically on the register 26.

Movement of the sample holder 6 changes the number of fibers intersecting the scan line, and this in turn results in an imbalance in the comparator containing the light-sensitive element 14. A signal from this system passes through the converter 20 and the amplifier 22 to the motor 28. The motor 28 runs in such a direction as to drive the tap 18 on the potentiometer 16 to a position where the balance will be restored. When the balance is restored, there is no signal input into the converter 20 and the motor 28 stops. The degree of movement, or position, of the output shaft of the motor 28 becomes a measure of the number of fibers intersecting the scan line when the tap 18 has reached a balancing position. This quantity is reflected numerically upon the register 30.

The motor 28 also drives the tap 42 on the potentiometer 44. This movement corresponds to the movement of the tap 18 and the movable elements in the register 30. Hence, the position of the tap 42 along the length of the coil of the potentiometer 44 is also a function of the number of fibers intersecting the scan line.

The potential at the tap 42 is balanced against the potential at the tap 50 on the potentiometer 46. Any differential which may exist between these quantities is fed to the amplifier 56 and then to the motor 52. The motor 52 operates, in turn, to shift the position of the tap 50 so as to bring about a balance between its potential and the potential at the tap 42. It may be helpful to think of the potential across the upper end portion of the potentiometer 46 at this moment as corresponding to the quantity $a$ in FIG. 2.

This completes the first major operation involved in the use of the system. In order to initiate the next major operation, the switches 58, 64, 66 and 70, are opened and the switches 60, 62 and 68 are closed. It should be here noted that the motor 52 is not connected to an amplifier and that the voltage at tap 50 "remembers" the "A" value.

The input to the amplifier 56 now is the difference between the potential at the tap 42 on the potentiometer 44 and the potential at the tap 54 on the potentiometer 48. This drives the motor 28 in such a direction as to move the tap 42 upwardly to a new balance point. The potential at the tap 54 corresponds to the distance $c$ in FIG. 2, because it is a selected fraction of the potential across the upper end portion of the potentiometer 46.

The operation of motor 28 also causes movement of the tap 18 along the potentiometer 16 in the light balancing circuit. As this circuit shifts out of balance, there is again a signal input for the converter 20 and the amplifier 22. The output of the amplifier 22 is passed to the motor 24 through the switch 62, and the motor 24 moves the sample holder 6 downwardly until a new balance position is reached. The extent of movement is reflected upon the register 26 which registers a numerical quantity corresponding to the distance $d$ in FIG. 2

The motor 24 also operates the tap 32 on the potentiometer 34. However, this action is not important, because the switch 66 is open, and there is no output from the amplifier 40.

It will now be evident that the fundamental nature of the system of this invention is not dependent upon the particular circuit or the mechanical components suggested in FIG. 1. This diagrammatic view is exemplary only and it serves merely as a convenient example of the equipment which may be employed.

One of the possible variations which will be evident to persons skilled in the art is the elimination of the several motors 24, 28 and 52. In the past, instruments for measuring fiber distribution have been manually operable, in the sense that the operator of the machine was obliged to move those parts which required readjustment in order to bring about balanced conditions. Similar arrangements may be employed in the present invention, if desired.

It should also be evident that the sample sensing and balancing units may take various physical forms. Light sensing systems have been used heretofore, and such systems are quite satisfactory. However, the invention is not restricted to the employment of such a system. Moreover, the unit may include various means for evaluating the amount of light passing through the sample in terms of the number of fibers scanned. Such means may be in the form of optical systems, as disclosed in the aforementioned Hertel patent and in Puster Patent No. 2,648,251, granted August 11, 1953, or it may be an electrical system, as indicated in FIG. 3 of this application.

The several reference standards also may take various physical forms. Potentiometers have been illustrated in FIG. 1, but other types of regulatable standards would suffice.

FIG. 3 is a circuit diagram for an actual instrument embodying the present invention. This instrument is adapted for various types of routine measurement activities and also for experimental work . Referring again to FIG. 2, the instrument depicted in FIG. 3 is so constructed that $b$ values corresponding to one-eighth inch, one-quarter inch, and one-half inch may be established without requiring the exercise of judgment on the part of the operator and without requiring adjustments in the equipment. Moreover, any other desired $b$ value may be established by a simple, straightforward adjustment procedure.

Similarly the instrument is flexible with respect to the ratio of $c$ to $a$. Values corresponding to three percent, 12.5 percent and fifty percent may be obtained without adjustment, and when desired, any other ratio may be established by a straightforward adjustment.

In the instrument of FIG. 3, the light source is a daylight fluorescent bulb 72, driven by a high frequency alternating current to minimize flicker. An energizing current of 26 kilocycles per second has been found suitable for the bulb 72, but it will be understood that other frequencies may be employed if desired.

Light from the bulb 72 passes through a zone occupied by a fiber sample diagrammatically indicated at 74 in FIG. 3, is focused by lenses 76, and passes onto photocells 78. The construction and arrangement of these components may be the same as that disclosed in Puster Patent No. 2,648,251.

The instrument is provided with means for balancing the electrical effects produced when different amounts of light reach the photocells 78. Various types of balancing means have been proposed and used satisfactorily heretofore. In this connection, attention again is invited to Hertel Patent No. 2,299,983, and to Puster Patent No. 2,648,251. The essential characteristic of the balancing means is that it be so formed that a unit of motion of an adjustable element will correspond to a unit change in the number of fibers intersecting the scan line.

In FIG. 3, the balancing means is entirely electrical. It includes a squaring potentiometer unit having a pair of similar potentiometers 80 and 82 with their taps 84 and 86 mechanically interconnected so as to move together in unison. The coil of the potentiometer 80 is connected to a source of positive potential and the coil of the second potentiometer 82 is connected to the tap 84 on the potentiometer 80.

The balancing potential is further modified in FIG. 3 by an adjustable load 88 connected to the tap 86 of the potentiometer 82, and by a calibrating resistance 90 interposed between the potentiometer 80 and ground. The calibrating resistance 90 is referred to as the "LO-CAL", because its chief value arises from its ability to condition the balancing system for proper operation in the lower-middle range of values for the number of fibers intersecting the scan line.

A second calibrating resistance 92 is located in the bias circuit for the cells 78. Its primary function is to provide a means for adjusting the balancing system for proper operation in the higher range of number-of-fibers values. Its tap 94 is connected through a high value resistor 96 to the plate circuit for the photocells 78.

Also connected to the plate circuit for the photocells 78 through a high value resistor 98 is the tap 100 of a potentiometer 102 connected across the load resistor 88 mentioned above. The tap 100 constitutes a "Zero" adjustment for the system, in that it may be adjusted to pick off the correct potential for balancing the system when there are no fibers in the scan line and when the taps 84 and 86 of the squaring potentiometer unit have been moved to their uppermost positions.

A solenoid 104 may operate to mechanically couple the tap 100 of the zero control to a motor 106, when adjustment of the tap 100 is required. Ordinarily, however, the solenoid 104 is deenergized, and the tap 100 is not coupled to the motor 106.

Ordinarily, the light balancing system of the instrument is calibrated by the use of sheets of white linen-embossed cellophane. Varying numbers of sheets are positioned in the space between the fluorescent light bulb 72 and the lenses 76, and the system is brought into balance by changing the various adjustable components. When a balance is attained, there is no voltage on an electrostatic alternator 108 which constitutes an output for the comparator.

The movable element of the unit 108 is driven back and forth relative to the fixed element or plate by means of a solenoid 110 energized by a sixty cycle alternating current. As the movable element moves back and forth, the space between the plates, and the capacitance of the device, changes in rhythm with the energizing current for the solenoid 110.

Thus, it will be seen that the unit 108 acts as a converter for the D.C. signal output from the comparator. It converts this D.C. signal into an A.C. signal, and the phase of the A.C. signal relative to the energizing current for the solenoid 110 depends upon the sign of the D.C. signal. That is to say, the A.C. signal produced by a positive charge on the fixed plate of the unit 108 will be one hundred and eighty degrees out of phase with respect to an A.C. signal produced by a negative charge on the fixed plate. This distinction between positive and negative signals makes it possible to drive the two phase motors of the unit in the proper directions to restore balance conditions.

Although the electrostatic converter 108 is a convenient and desirable structure for use in the instrument of the present invention, it will be apparent to persons skilled in the art that other types of converters may be employed if desired.

The output from the converter 108 is coupled to a preamplifier 112 of conventional construction. The signal then passes to a gain control device 114 and on to a suitable A.C. amplifier 116.

It has been mentioned that the taps 84 and 86 of the squaring potentiometer unit move up and down in unison. Such movements are brought about by a motor 120. The mechanical output from this motor also is connected to a number-of-fibers indicator or register 121 of conventional construction and to a tap 122 on a reference potentiometer 124. The reference potentiometer 124 therefore is conditioned to reppresent the number of fibers intersecting the scan line when the system is in balance. A position of the tap 122 at the top of the coil of the potentiometer 124 would correspond with a condition in which no fibers were intersecting the scan line. Conversely, a position of the tap 122 adjacent the lower end of the potentiometer 124 would conform to a condition in which a maximum number of fibers intersected the scan line.

The coil of the potentiometer 124 is energized from a secondary coil 126 of a transformer 128, the primary coil 130 of which is connected across a 110 volt, 60 cycle, line.

The tap 122 is connected to one end of a primary coil 132 of a transformer 134. This transformer 134 includes a secondary coil 136 connected to a potentiometer 138 having a tap 140 which leads to an A.C. amplifier 142. The potentiometer 138 constitutes a gain control for the input to the amplifier 142.

The signal appearing across the primary coil 132 of the transformer 134 represents the difference in potential between the tap 122 on the potentiometer 124 and a selected reference potential. The selection is accomplished by manipulation of a group of switches which will be referred to in greater detail below. It will suffice at this point to explain briefly the quantities with which the potential at the tap 122 may be compared.

One such quantity is the potential at a tap 143 on a potentiometer 144 connected across another secondary 146 of the transformer 128. In FIG. 3, the tap 143 on the potentiometer 144 is coupled mechanically to the motor 106. Whenever the motor 106 is energized, the tap 143 will move up or down, depending upon the direction of rotation of the motor.

Referring to FIG. 2, the potential at the tap 143 may be thought of as corresponding to the quantity $a$ in FIG. 2. When the instrument is used, it is desirable that the next step in the process employ, as a base quantity, a value $c$ corresponding to a predetermined fractional part of $a$. In FIG. 3, this result is accomplished by connecting a branch resistance path in parallel with the upper portion of the coil of the potentiometer 144.

This branch line is made up of resistors 148, 150, 152 and 154, with potentiometers 156, 158, and 160 interposed between adjacent ones of the resistors. The taps on the potentiometers 156, 158 and 160 are manually adjustable. This flexibility permits precise adjustment of the ratio of $c$ to $a$. In the embodiment illustrated in FIG. 3, the resistor 148 and the right end portion of the coil of the potentiometer 160 have a resistance equal to three percent of the total resistance of the branch line extending across the upper end portion of the coil of the potentiometer 144. That is to say, the potential at the tap 161 on the potentiometer 160 is equal to three percent of the resistance at the tap 143 on the potentiometer 144. The other resistance quantities employed in the branch line are such that the potential at the tap of the potentiometer 158 equals 12.5 percent of the resistance at the tap 143 of the potentiometer 144, and the potential at the tap of the potentiometer 156 equals fifty percent of the potential at the tap 143. Any one of these specific fractions or percentage points may be compared with the potential at the tap 122 on the potentiometer 124, if desired, the selection being based upon which of the several switches are actuated.

These fixed percentage points provide a convenient set up for routine measurement activities. However, experimental work is likely to require greater flexibility in the selection of the ratio of $c$ to $a$. For this reason, the circuit is arranged so that the operator of the instrument has complete freedom in selecting the quantity $c$. A potentiometer 162 connected across the secondary 126 of transformer 128 and having a manually adjustable tap 164 serves this function. Such adjustment is facilitated, in a preferred form of the invention, by the disposition of a control knob on the face of the instrument. Instruments have been provided wherein the potentiometer 162 is supplied with a switch so that it may be placed between potential points 166 and 143. Potentiometer 162 can now be calibrated directly in percent span length.

One other quantity may be compared with the potential of the tap 122 on the potentiometer 124. This is a potential equal to the potential at the top of the coil of the potentiometer 124. In FIG. 3, this potential would be that at the junction point 166 representing a terminal of the secondary coil 146 on the transformer 128.

Thus, it will be seen that a number of different comparisons may be made with the potential of the tap 122 on the potentiometer 124. When a comparison is being made, there will be an input to the amplifier 142 as long as the quantities compared differ from each other. However, when a balance is obtained, the transformer 134 ceases to operate, and no signal is fed to the amplifier 142.

It should be observed also that the phase of the voltage across the primary coil 132 of the transformer 134 depends upon whether the potential at the tap 122 on the reference potentiometer 124 is higher or lower than the potential with which it is being compared. This provides a directional distinction which makes it possible to drive the computer motors in such a direction as to restore balance conditions.

Yet another reference potentiometer is designated by the numeral 168. Its tap 170 is mechanically coupled to a motor 171 for controlling the position of the sample holder relative to the scan line of the instrument. Thus, the position of the tap 170 along the coil of the potentiometer 168 is a function of the position of the grip line for the fibers relative to the scan line. A register or indicator 167 of conventional construction also is connected to the motor 171, and it serves to provide a numeral value corresponding to the distance between the grip line and the scan line.

A position of the tap 170 at the top of the potentiometer 168 corresponds to a condition in which the scan line and the grip line for the sample are separated by a distance greater than the distance of protrusion of any of the fibers in the sample. A distance of four inches has been found to be a suitable value for cotton samples. Conversely, when the tap 170 is disposed adjacent the lower end of the potentiometer 168, the scan line and the grip line for the fibers will be close together.

The potential at the tap 170 is fed to one end of a primary coil 172 of a potentiometer 174. The secondary coil 176 of the potentiometer 174 is connected through a suitable gain control 178 to an amplifier 180.

Connected in parallel with the potentiometer 168 is a branch containing a plurality of potentiometers 182, 184, 186, 188, and 190, and also a plurality of resistors 191, 192, 194, 196 and 198. The resistance values of these elements are chosen, in relation to the resistance of the coil of the potentiometer 168, so that the potentials at the taps of the potentiometers 182, 184, 186 and 188 will have dimensional significance. The potential at the tap of the potentiometer 182 corresponds to a potential at the tap 170 when the scan line and the grip line for the sample are separated a distance of four inches. The tap of the potentiometer 184 is at a potential corresponding to a separation of the scan line and the grip line of one-half inch. The potential at the tap of the potentiometer 186 corresponds to a one-quarter inch separation, and the potential at the tap of the potentiometer 188 corresponds to a one-eighth inch separation. By manipulating an appropriate one of the switches in the system, any of these potentials may be compared with the potential at the tap 170 of the potentiometer 168 by connecting such potential to the opposite end of the primary coil 172 of the transformer 174.

The potentiometer 190 serves a somewhat different function. It will be observed that the tap for this potentiometer is connected to the terminal 166 of the secondary coil 146 on the transformer 128. Hence, the potentiometer 190 provides a means for adjusting the "Zero" potential at the terminal 166, if necessary.

Provision is made for comparing the potential at the tap 170 with an adjustable potential. When desired, the manually adjustable tap 164 on the potentiometer 162 referred to above may be connected to the opposite end of the coil 172 of the transformer 174. This provides a means by which the operator may select any distance that may suit his purposes. In other words, this gives the instrument a flexibility adapting it for use in experimental work as well as for routine measurements.

The motors 106, 120, and 171, are two-phase synchronous motors. One of the coils of each motor is connected across a sixty cycle line, and the other coil of each may be connected to one of the amplifiers 116, 142 and 180. When one of the amplifiers is connected to a motor, the motor will run in a direction which depends upon the phase of the signal from the amplifier.

The switches for controlling the instrument are arranged in two banks. One bank includes the switches designated by the letters A, B, C, D, E, F, G and H. The other bank of switches includes those designated I, J, K, L, M, N, O, P, Q, R and S. All of the switches are provided with back contacts, and they are biased toward a position in which the back contacts, are closed, as illustrated.

The first bank of switches is under the control of four actuating buttons. These have been designated "⅛ IN.", "¼ IN.", "½ IN.", and "SET IN." When one of these buttons is pushed, it moves not only the switch directly in line therewith but also the switches A, B, C and D. For example, if the "½ IN." button is pushed, the switches A, B, C, D and G are actuated so as to close the front, or uppermost, contacts.

The arrangement of the switches in the second bank is somewhat similar. These switches are controlled by five buttons, designated, respectively, "50%," "12.5%," "3%," "SET %", and "ZERO". Actuation of any one of the buttons will cause actuation of the switch directly in alignment therewith and also certain other switches, as indicated by the broken lines.

Although the nature of the circuit of FIG. 3 now should be clear, it may be helpful to describe briefly a typical sequence of operations for the instrument. The initial operations should be directed toward assuring proper calibration of the instrument. During these operations, there ordinarily will be no fibers in the sample holder of the instrument.

The first step is to actuate the "ZERO" button. This moves the blades of the switches I, J, K, Q, R and S from the positions shown in FIG. 3 to positions bridging the front contacts of these switches. Switch I connects the motor 106 to the output of the amplifier 116. Switch J connects the motor 120 to the output of the amplifier 142. Switch K connects the motor 171 to the output of the amplifier 180. The switch Q causes energization of the solenoid 104 for mechanically coupling the Zero control tap 100 to the motor 106. The switch R connects the tap on the potentiometer 182 to an end of the primary coil 172 of the input transformer for the amplifier 180, so that the signal across the coil 172 is the difference in potential between the tap on the potentiometer 182 and the tap 170 on the potentiometer 168. Finally, the switch S connects the junction point 166 to an end portion of the primary coil 132 of the input transformer 134 for the amplifier 142, so that the input signal corresponds to the difference in potential between the tap 122 on the potentiometer 124 and the junction point 166 at one end of the secondary coil 146 of the transformer 128.

With the various components interconnected in this manner, there will be an output from the amplifier 180 until the motor 171 has moved far enough to bring the tap 170 to a position of balance with the potentiometer 182. As mentioned above, this is a position which corresponds to a spacing of about four inches between the scan line and the grip line for the sample. Movement of the tap 170 on the potentiometer 168 will be accompanied by corresponding movements of the holder for the sample 74 and of the movable components of the distance register 167. Note that the number on the face of the register 167 is "4000", corresponding to a distance of four inches.

The amplifier 142 will have an output for as long as a difference in potential exists between the tap 122 on the potentiometer 124 and the junction point 166 at the end of the transformer coil 146. This differential will be eliminated when the motor 120 has moved far enough to bring the tap 122 into a balancing position. Corresponding movements will take place simultaneously at the taps 84 and 86 of the squaring potentiometer unit and at the number-of-fibers indicator 121.

During this step, the taps 84 and 86 on the squaring potentiometer unit are moved arbitrarily in unison with the movement of the tap 122 on the reference potentiometer 124. That is to say, the movement of the taps 184 and 186 is not intended to be a function of the amount of light or the number of fibers. If there is an output from the amplifier 116, representing an imbalance between the sensing system and the balancing system, it will be fed to the motor 106. This motor will move to shift the tap 100 on the Zero potentiometer 102 to a position where a balance will exist. The motor 106 is coupled to the tap 100 by the solenoid 104 at this time. The motor 106 also will drive the tap 142 on the potentiometer 144, but this movement has no significance in the system, because the value of the potential at the tap 142 is not being compared with any other quantity in the system.

If the distance indicator 167 shows a value materially different from "4000," the instrument may be adjusted to bring it into calibration by shifting the tap along the potentiometer 182. Similarly, the number of fibers register 121 may be brought approximately to a "0000" reading by shifting the tap along the potentiometer 190. Then, the "ZERO" button is released to restore the switches to the condition shown in FIG. 3.

The next step in calibrating the instrument would be to obtain checks on the conditions prevailing when the "¼ IN.," "⅛ IN." and "½.," buttons are depressed. These operations are all similar and a description of one will suffice for all.

When the "⅛ IN." button is depressed, it shifts the blades of the switches A, B, C, D and E to positions where they bridge the front contacts of the switches. Switch A connects the motor 171 with the output from the amplifier 180. The switch B connects the motor 120 with the output from the amplifier 116. Switch C connects the motor 106 with the output on the amplifier 142. Switch D connects the tap 143 on the potentiometer 144 to an end of the primary coil 132 of the input transformer 134 for amplifier 142. Switch E connects the tap on the potentiometer 188 with an end of the primary coil 172 of the input transformer 174 for the amplifier 180.

With the components interconnected in this manner, there will be an output from the amplifier 180 because there will be a difference in potential between the tap 170 on the potentiometer 168 and the tap on the potentiometer 188. The motor 171 will rotate in a direction to move the tap 170 down to a position in which a balance is attained. This position should correspond to a spacing between the scan line and the grip line for the fiber sample equal to about one-eighth of an inch. If the distance indicator 167 varies materially from a reading of "0125," the tap on the potentiometer 188 should be adjusted to bring the reading to the proper value.

Since there is nothing in the light path from the lamp 72 to the cells 78 at this point in the calibration process, the previously established light balance will prevail. There will be no output from the amplifier 116, and the motor 120 will remain stationary.

As explained above, the initial movement of the tap 143 on the potentiometer 144 was arbitrary in character. Therefore, it is likely that there will be some difference in the potential between the tap 143 and the tap 122 on the potentiometer 124. If so, there will be an input to the amplifier 142, and this amplifier will drive the motor 106 in such a direction as to shift the tap 142 to a position where a balance will be obtained.

Similar tests may be made for the "¼ IN." and "½ IN." buttons. In each instance, it may be necessary to adjust the appropriate potentiometer 186 or 184, in order to obtain proper readings on the register 167.

The next series of steps should be devoted to checking the accuracy of the percentage points in the system. In order to prepare the instrument for these checks, an eight and one-half by eleven sheet of paper may be taped to the sample holder carriage so that one corner of the sheet slides approximately three inches under the light source. With this arrangement, a wedge-shaped portion of the sheet will protrude from the carriage, and the lateral extent of this portion at the scan line may be varied by shifting the carriage longitudinally.

Then, the "SET IN." button may be pressed. When this button is pressed, the blades of the switches A, B, C, D, and H, are shifted so as to bridge the front contacts of these switches. This causes a comparison between the potential at the tap 170 on the potentiometer 168 and the potential at the manually adjustable tap 164 on the potentiometer 162. Any difference in these potentials will drive the amplifier 180 and cause movement of the motor 171 in such a direction as to bring about a balanced condition by movement of the tap 170. This movement is accompanied by corresponding movement of the sample holder to which the sheet of paper is attached and produces a variation in the amount of light reaching the cells 78.

When the light balance is disturbed, the amplifier 116 has an output which serves to drive the motor 120, and this motor in turn moves the taps 84 and 86 on the squaring potentiometer unit to establish a new balance point.

Thus, it will be seen that there is an interaction between the two comparisons just described. This interaction permits the operator of the instrument to obtain a desired reading on the register 121 by manipulation of the tap 164 for the potentiometer 162. He can move this tap along the potentiometer until a condition is reached in which the reading on the number-of-fibers register 121 will be "1000."

At the same time, the condition of the system with the "SET IN." button pressed is such that the amplifier 142 responds to any difference in potential between the tap 122 on the reference potentiometer 124 and the potential at the tap 143 on the potentiometer 144. The amplifier 142, in turn, drives the motor 106, and the motor 106 shifts the position of the tap 143 to restore the balance. In this condition of the circuit, the potential at the tap 143 becomes a standard quantity against which various fractional parts or percentage points may be calibrated.

The calibration of each of the buttons designated "50%," "10%" and "3%" is accomplished in the same fashion and a description of one will suffice. When the "50%" button is pressed, the blades of the switches J, L and M will be shifted to positions where they will bridge the front contacts of these switches. In this condition of the circuit, the amplifier 142 receives a signal corresponding to the difference in potential between the tap on the potentiometer 156 and the tap 122 on the potentiometer 124. The output from the amplifier 142 is fed to the motor 120, to drive the tap 122 to a position of balance, and to record the position of the tap 122 on the number-of-fibers counter 121. By definition, this amount is 50% of the standard, and the register 121 should stop at a reading of "0500." If it varies from this number, an adjustment should be made in the position of the tap on the potentiometer 156.

During this operation, the movements of the taps 84 and 86 on the squaring potentiometer unit will cause a signal to be fed to the amplifier 116. This signal in turn will be employed to drive the motor 171 to move the sample holder to a new position of balance. This will change the reading on the distance register 167, but the amount of movement of the holder is not of interest at this point in the calibration procedure and it may be ignored.

After all of the percentage points have been checked and appropriate adjustments made in the positions of the taps on the potentiometers 158 and 160, attention should be directed to calibration of the optical balance unit.

This calibration may be carried out conveniently with the aid of sheets of linen-embossed cellophane. Selected numbers of such sheets are positioned in the zone normally occupied by the fiber sample 74 to produce light variations comparable to those produced by varying numbers of fibers. By making appropriate adjustments in the load resistor 88, the "LO-CAL" resistor 90 and the "HI-CAL" resistor 92, the system can be adjusted to a condition in which a unit of movement of the taps 84 and 86 on the squaring potentiometer unit will correspond to a unit change in the number of fibers disposed between the lamp 72 and the photocells 78.

After the calibration operations have been completed, the instrument is ready for routine measurement work, and no adjustments probably will be required for some time. When a series of measurements are to be made, the instrument should first be brought to its base condition by pressing the button marked "ZERO". The effects produced by pressing this button have been described in detail above and need not be repeated here. It will suffice to point out that the taps 84, 86, 122 and 170 are moved upwardly to bring the registers 121 and 167 to the "0000" and "4000" positions thereof. The tap 100 on the zero potentiometer 102 also is shifted so as to bring about a balance preventing any further input to the amplifier 116.

The next step in the operation involves the establishment of a standard for a given sample corresponding to the quantity $a$ in FIG. 2. After a fiber sample is positioned in the instrument, this may be accomplished by pressing one of the buttons of the left bank of buttons, such as the button marked "¼ IN." At this time, the amplifier 180 will respond to the difference between the potential at the tap on the potentiometer 188 and the potential at the tap 170 on the potentiometer 168. This signal serves to drive the motor 171 so as to move the tap 170 downwardly to a new position of balance which should correspond to a spacing of one quarter of an inch between the scan line and the grip line for the fibers. The sample 74 will be moved a corresponding amount.

Movement of the sample 74 throws the sensing comparator out of balance to actuate amplifier 116. This, in turn, drives the motor 120 to restore the balance, and also to move the tap 122 on potentiometer 124 to a new position.

As the tap 122 moves, the balance between its potential and the potential at the tap 143 on the potentiometer 144 is disturbed to cause an input to the amplifier 142. However, this serves to drive the motor 106 in a direction such as to move the tap 143 to a new position of balance. The potential at this new position corresponds to the quantity $a$ in FIG. 2.

After the standard $a$ has been established, the distance $d$ or some particular fractional part of the standard $a$ may be obtained by pressing one of the percent buttons. This results in a comparison between the potential at the tap 122 with the potential at the tap of one of the potentiometers 156, 158, or 160, and when the instrument again reaches a state of balance, the distance quantity $d$ will appear upon the number-of-fibers counter 167.

The value $d$ may be used for various purposes depending upon the standards underlying its selection. Where spinnability is of interest, results of particular value may be obtained by establishing the standard $a$ at a distance $b$ equal to one-quarter inch. From this standard, one can proceed to record the various percent figures. The 12.5 percent figure has been found to have close correlation with the spinnability of the fifibers.

Although specificic embodiments of the invention have been illustrated and described in detail, it is recognized that various alterations and modifications will be evident to persons skilled in the art. It is intended therefore that the foregoing description be considered as exemplary only, and that the scope of the invention be ascertained from the following claims.

We claim:

1. A method of ascertaining fiber length information comprising the steps of obtaining, from a random sample of parallelized fibers gripped along a randomly located line at right angles to the lengths of the fibers, a measure of the number of fibers intersecting a reference line at right angles to the lengths of the fibers, and then determining the distance from said grip line to a parallel line intersecting a predetermined fractional part of said number of fibers.

2. A method of ascertaining fiber length information related to the spinnability of cotton fibers comprising the steps of obtaining, from a random sample of parallelized cotton fibers gripped along a randomly located line at right angles to the lengths of the fibers, a measure of the number of fibers intersecting a reference line at right angles to the lengths of the fibers a predetermined distance from said grip line in one direction, and then determining the distance in said direction from said grip line to a parallel line intersecting a selected percentage of said number of fibers.

3. A method of obtaining fiber length information comprising holding a random sample of substantially parallelized fibers along a grip line extending across the sample, scanning the sample with a light beam along a scan line disposed in a predetermined but variable spacial relation to said grip line, using a comparator having movable balancing means to evaluate the amount of light passing through the sample by moving said balancing means into a position corresponding to the number of fibers in the light beam, simultaneously moving the adjustable member of a variable reference device an amount comparable to the amount of movement of said balancing means, comparing the quantitative value of said reference device with the quantitative value of a regulatable standard, eliminating any imbalance between said quantitative values by adjusting said regulatable standard, then comparing a predetermined fractional part of the value of the adjusted regulatable standard with the value of said reference device, eliminating imbalance in the last-mentioned values by moving the adjustable member of the variable reference device, simultaneously moving said balancing means an amount comparable to the amount of movement of said adjustable member to throw said comparator out of balance, and restoring the balance of the comparator by increasing the spacing between said grip line and said scan line.

4. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers and a first regulatable standard against which the sensed number of fibers may be compared; a second comparator including means responsive to the distance between said scan line and said grip line and a second regulatable standard against which said distance may be compared; and a third comparator including adjustable reference means adjustable in unison with said first regulatable standard and a third regulatable standard against which the condition of said adjustable reference means may be compared.

5. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers, a first regulatable standard against which the sensed number of fibers may be compared, said standard having a movable member and being constructed so that a unit of motion of said movable member results in an effect comparable to the effect produced by a unit change in the number of fibers intersecting the scan line, and an indicator operably connected to said movable member to provide a number-of-fibers indication when said first comparator is in balance; a second comparator including means responsive to the distance between said scan line and said grip line, a second regulatable standard against which said distance may be compared, a second indicator operably connected to said distance responsive means to provide a distance indication; and a third comparator including adjustable reference means adjustable in unison with said first regulatable standard and a third regulatable standard against which the condition of said adjustable reference means may be compared.

6. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers and a first regulatable standard against which the sensed number of fibers may be compared; a second comparator including means responsive to the distance between said scan line and said grip line and a second regulatable standard against which said distance may be compared; and a third comparator including a third regulatable standard, adjustable means operatively connected to said third regulatable standard for representing a selected fractional part of the value of said third regulatable standard, and adjustable reference means against which either said third regulatable standard or said adjustable means may be compared selectively, said adjustable reference means being adjustable in unison with said first regulatable standard.

7. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers and a first regulatable standard against which the sensed number of fibers may be computed; a second comparator including means responsive to the distance between said scan line and said grip line and a second regulatable standard against which said distance may be compared; a third comparator including a third regulatable standard, adjustable means operatively connected to said third regulatable standard for representing a selected fractional part of the value of said third regulatable standard, and adjustable reference means against which either said third regulatable standard or said adjustable means may be compared, said adjustable reference means being adjustable in unison with said first regulatable standard; a first motor for causing relative movement between said grip line and said scan line and being selectively responsive to conditions of imbalance in either said first or said second comparator; a second motor for regulating said first regulatable standard and being selectively responsive to conditions of imbalance in either said first or said third comparator; and a third motor for regulating said third regulatable standard and being responsive to conditions of imbalance in said third comparator.

8. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers and a first regulatable standard against which the sensed number of fibers may be compared, said standard having a movable member and being constructed so that a unit of motion of said movable member results in an effect comparable to the effect produced by a unit change in the number of fibers intersecting the scan line; a second comparator including means responsive to the distance between said scan line and said grip line and a second regulatable standard against which said distance may be compared; and a third comparator including a potentiometer having a tap operatively connected to said movable member of said first comparator for movement in unison therewith, and a third regulatable standard against which the voltage of said potentiometer tap may be compared.

9. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers and a first regulatable standard against which the sensed number of fibers may be compared, said standard having a movable member and being constructed so that a unit of motion of said movable member results in an effect comparable to the effect produced by a unit change in the number of fibers intersecting the scan line; a second comparator including means responsive to the distance between said scan line and said grip line and a second regulatable standard against which said distance may be compared; and a third comparator including a first potentiometer having an adjustable tap, a branch path connected in parallel with a portion of said potentiometer between a fixed point and said tap, said path having voltage-divider means for establishing a selected fractional part of the potential drop over the path, and a reference potentiometer having a movable tap operatively connected to said movable member of said first comparator for movement in unison therewith, and circuit means operable in response to differences in potential between said reference potentiometer tap and either said tap on said first potentiometer or said voltage divider means.

10. An instrument for obtaining fiber length information from a sample of substantially parallel fibers comprising means for holding the fibers along a grip line extending across the sample; means for sensing the number of fibers intersecting a scan line; said holding means and sensing means being movable relative to each other to alter the spacing between said grip line and said scan line; a first comparator including means responsive to the sensed number of fibers and a first regulatable standard against which the sensed number of fibers may be compared; a second comparator including means responsive to the distance between said scan line and said grip line and a second regulatable standard against which said distance may be compared; a third comparator including a third regulatable standard, adjustable means operatively connected to said third regulatable standard for representing a selected fractional part of the value of said third regulatable standard, and adjustable reference means against which either said third regulatable standard or said adjustable means may be compared, said adjustable reference means being adjustable in unison with said first regulatable standard; a first motor for causing relative movement between said grip line and said scan line and being selectively responsive to conditions of imbalance in either said first or said second comparator; a second motor for regulating said first regulatable standard and being selectively responsive to conditions of imbalance in either said first or said third comparator; a third motor for regulating said third regulatable standard and being responsive selectively to conditions of imbalance in either said first or said third comparator; and an automatic zero control selectively operable by said third motor when said third motor is responsive to said first comparator to bring said first comparator into a condition of balance with no fibers intersecting the scan line and with said first regulatable standard in its extreme condition corresponding to no fibers.

References Cited in the file of this patent
UNITED STATES PATENTS 2,299,983 Hertel Oct. 27, 1942